R. GOLDSCHMIDT.
MACHINE FOR RECEIVING ELECTRIC WAVES.
APPLICATION FILED DEC. 10, 1912.
1,087,113.
Patented Feb. 17, 1914.
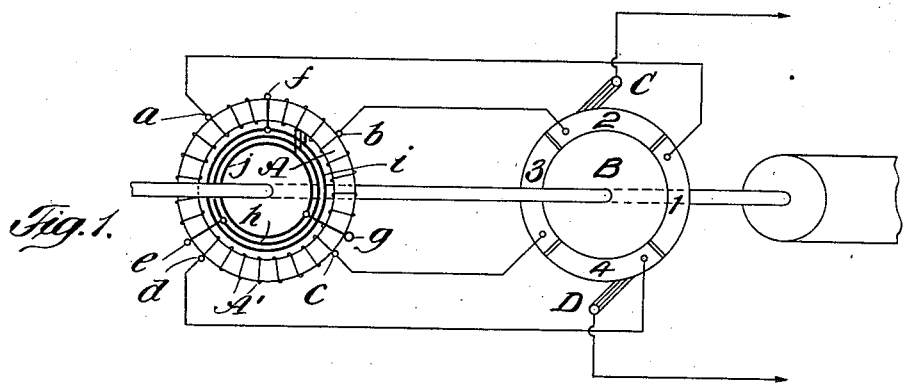
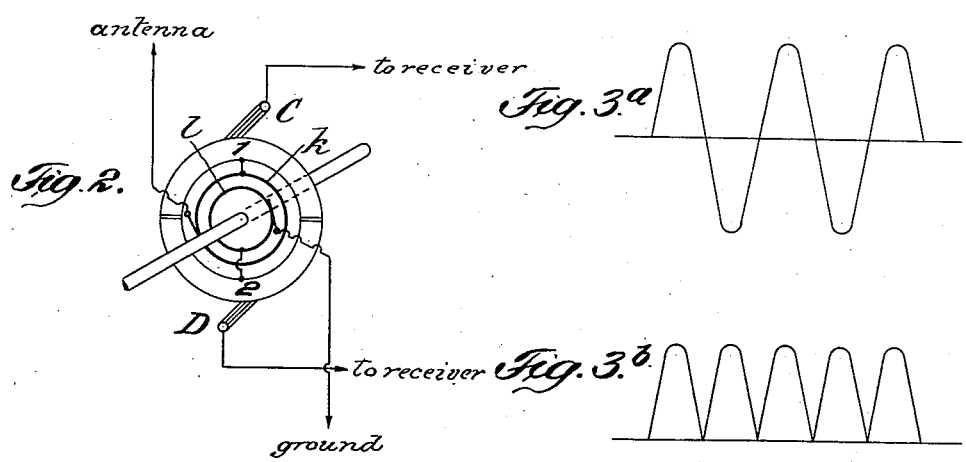
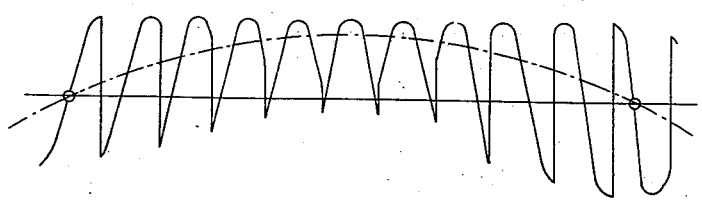
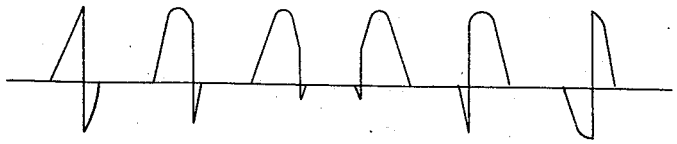
Witnesses:
Inventor
Rudolf Goldschmidt
By his Attorney

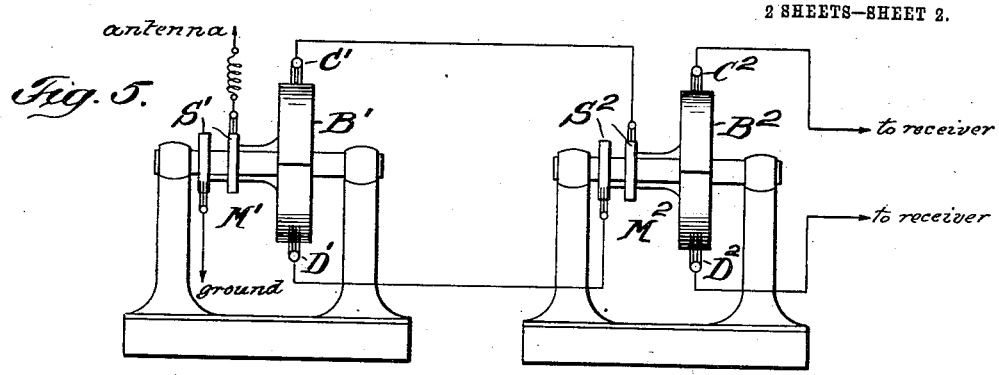
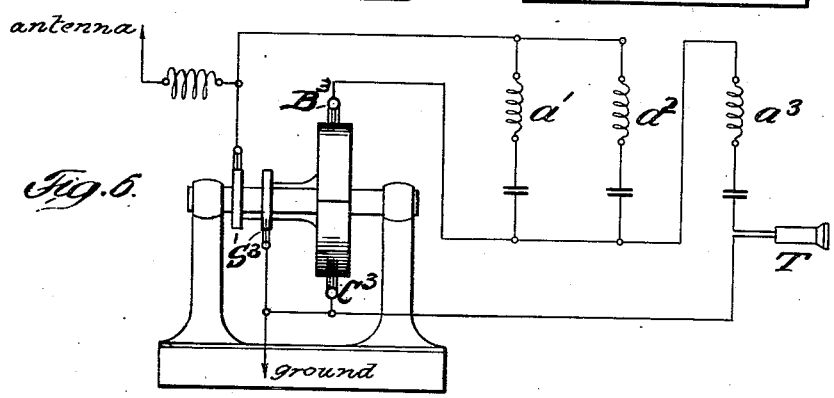
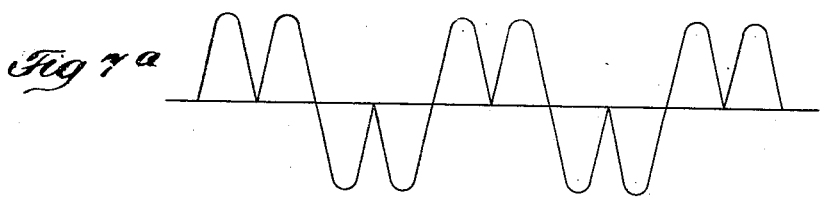
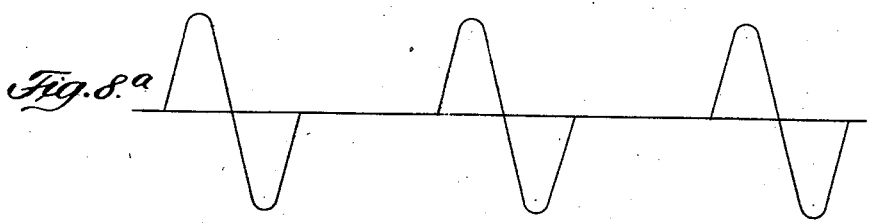

UNITED STATES PATENT OFFICE.

RUDOLF GOLDSCHMIDT, OF BERLIN, GERMANY.

MACHINE FOR RECEIVING ELECTRIC WAVES.

1,087,113.   Specification of Letters Patent.   Patented Feb. 17, 1914.

Application filed December 10, 1912. Serial No. 735,937.

*To all whom it may concern:*

Be it known that I, RUDOLF GOLDSCHMIDT, a citizen of Germany, residing at Berlin, Germany, have invented a new and Improved Machine for Receiving Electric Waves, of which the following is a specification.

This invention relates to a novel machine for changing the intercepted energy of electric waves, so as to render them perceptive in telephones or other receiving apparatus.

In a copending patent application filed by me March 29th, 1911 under Serial No. 617,735 for an apparatus for and method of receiving electric waves, I have described the use of an asynchronous transformer for reducing the frequency of the intercepted current. In the present patent application, I employ entirely different means for accomplishing this result of making the waves perceptible, these means consisting of a commutator, which is rotated asynchronously relatively to the frequency of the intercepted electric waves as more fully pointed out in the appended specification and claims.

In the accompanying drawing: Figure 1 is a diagrammatic view of a conventional rotary converter and its connections; Fig. 2 a similar view of a simplified construction thereof adapting the converter for the reception of high frequency currents; Fig. 3$^a$ a curve of the received alternating current; Fig. 3$^b$ a curve of the resulting direct current; Fig. 3$^c$ a curve illustrating a modified form of the resulting current; Fig. 4 a curve illustrating a further modified form of the resulting current; Fig. 5 a side view of a pair of rotary converters connected in cascade form; Fig. 6 a side view of a converter provided with means for returning the resulting secondary current to said converter; Fig. 7$^a$ a curve illustrating the current after the transformation by the first converter of Fig. 5; Fig. 7$^b$ a curve of the current delivered by the second converter of Fig. 5, and Figs. 8$^a$ and 8$^b$ are diagrams similar to Figs. 7$^a$ and 7$^b$, showing the current form, in case one of the commutator segments is omitted.

In order to elucidate the underlying principle of my invention, a rotary converter has been diagrammatically illustrated in Fig. 1, in which the letter A designates a rotary iron core provided with a short-circuited winding $A^1$. At the points $a, b, c, d$, winding $A^1$ is respectively connected to the segments 1, 2, 3, 4 of a commutator B, said segments being engaged by the brushes C, D. Winding $A^1$ is furthermore connected at the points $e, f, g$ to the slip-rings $h, i, j$ respectively. If the latter are supplied with three-phase current and if commutator B is rotated with such a speed that it performs one complete revolution during each period of the alternating current, direct current is furnished by brushes C, D.

For receiving high-frequency currents, the arrangement shown in Fig. 1 may be considerably simplified. As single phase current is generally used in wireless telegraphy and telephony, this current may be changed to three-phase current through phase division by means of condensers and inductances, although this method is not preferred. It is also of advantage to omit the wound core A and to reduce the number of commutator segments as much as possible. Thus in Fig. 2, the commutator is shown to comprise but two segments 1 and 2 which are connected to slip rings $k$ and $l$. The latter are in turn respectively connected to the antenna and ground, while the current is taken off segments 1 and 2 by brushes C and D. It is of course immaterial whether the commutator rotates or whether the brushes rotate, Fig. 2 showing the commutator made rotatable. It may however here be stated that the method is in no wise changed if the tension is divided by means of inductances or condensers, and if additional commutator segments are connected to the dividing points. If the commutator is rotated in synchronism with the arriving alternating current, and the brushes C and D are correctly adjusted, said alternating current (Fig. 3$^a$) is transformed into direct current (Fig. 3$^b$). The production of direct current in the manner described however, is very difficult, which is the more true with currents of such high frequency as are used in wireless telegraphy.

Since exact synchronism is not the sole condition for the production of direct current, but as a minute and unvariable adjustment of the brushes is also required, the generation of direct current appears to be practically impossible. If the commutator is rotated slightly slower or quicker than true synchronism with the intercepted or arrived current would require, brushes C and D will furnish a current, the tension of which is illustrated in Fig. 3$^c$. By connecting a telephone or a string-galvanometer, the membrane of the former or the string of the latter will receive an alternating current, the periodicity of the amplitude variation of which equals:

$$w \cdot \frac{n_1 - n_2}{n_1}$$

wherein $w$ represents the intercepted or arrived periodicity, $n_1$ the synchronous number of revolutions of the commutator and $n_2$ the actual number of revolutions thereof. Of course, the resulting current is not a pure alternating current, but a peaked current as illustrated in Fig. 3$^c$. These peaks however may be readily done away with by the insertion of inductances or other tuning means, in order to produce a pure alternating current of the desired periodicity. This procedure may sometimes be unnecessary, as the peaked alternating current is of ample efficiency to actuate the membrane or string. Pure alternating current may be obtained if desired by tension-division and phase-splitting as above described. The effect of the produced secondary current equals that of a pure alternating current as indicated by the dot and dash line, Fig. 3$^c$. If there is no need for a high efficiency of the commutator machine, the construction of the latter may be considerably simplified by omitting one of the two commutator-segments, thus replacing the commutator by a star-wheel which for the purpose of this invention is an equivalent thereof. The current obtained in this way is reproduced by the curve shown in Fig. 4, from which it is obvious that 50% of the energy is not utilized by omitting the second commutator segment. As the number of revolutions would be very high when using but one or two commutator segments, the speed may be readily reduced by increasing the number of segments.

In case mechanical reasons forbid the transformation of the current in but a single machine, a plurality of machines may be connected in cascade form, as illustrated in Fig. 5. Here the first machine M$^1$ is provided with slip-rings S$^1$, commutator segments B$^1$ and brushes C$^1$, D$^1$, the second machine M$^2$ being likewise furnished with slip-rings S$^2$, commutator segments B$^2$ and brushes C$^2$, D$^2$. Slip rings S$^1$ are connected to the antenna and ground respectively, while the transformed current is conducted from brushes C$^1$, D$^1$ to the slip-rings S$^2$ of the second machine to be here subjected to a further frequency reduction of amplitude variation by rotating commutator B$^2$ asynchronously relatively to the frequency of the current delivered from brushes C$^1$, D$^1$. The effect will be more clearly demonstrated by synchronously rotating both converters, i. e. if no attempt is made to generate low-frequency variation, but to produce direct current as illustrated in Fig. 3$^b$. The curve shown in Fig. 7$^a$ represents the current after the first transformation, while Fig. 7$^b$ illustrates it after the second transformation. In case every second commutator-segment is omitted, the current assumes the form illustrated in Fig. 8$^a$, the curve of the current after the second transformation being shown in Fig. 8$^b$.

The cascade-arrangement above described, may be simplified by repeatedly returning the resulting secondary current to one and the same machine, until the desired frequency has been obtained, as illustrated in Fig. 6. The intercepted current is conducted to slip-rings S$^3$, to be taken off from the commutator-segments by brushes B$^3$, C$^3$. After passing the tuning means $a^1$, the current is returned to slip-rings S$^3$, to be again transformed and returned over tuning means $a^2$. The resulting current is finally conducted to receiver T, whose circuit is tuned to the desired frequency variation by the tuning means $a^3$.

I claim:

1. In a machine of the character described, means for absorbing energy of high frequency from a passing electromagnetic wave, a commutator, means for conducting said absorbed energy to the commutator, means for rotating the commutator asynchronously relatively to the frequency of the absorbed energy, and energy-receiving means connected to the commutator.

2. In a machine of the character described, means for absorbing energy of high frequency from a passing electromagnetic wave, a commutator, means for conducting said absorbed energy to the commutator, brushes engaging the same, means for rotating the commutator asynchronously relatively to the frequency of the absorbed energy, and energy-receiving means connected to said brushes.

3. In a machine of the character described, means for absorbing energy of high frequency from a passing electromagnetic wave, a first and a second commutator, brushes engaging the same, means for conducting said absorbed energy to the first commutator, means for connecting the brushes of the first commutator with the second commutator, means for rotating the first commutator asynchronously relatively to the frequency of the absorbed energy, means for rotating the second commutator asynchronously to the frequency of the current delivered from the brushes of the first commutator to the second commutator, and current-receiving means connected to the brushes of the second commutator.

RUDOLF GOLDSCHMIDT.

Witnesses:
 HENRY HASPER,
 WOLDEMAR HAUPT.